United States Patent Office 3,458,623
Patented July 29, 1969

---

3,458,623
COMPOSITION
Joseph Edward Raymond, Saddle Brook, N.J., assignor to Hoffmann-La Roche Inc., Nutley, N.J., a corporation of New Jersey
No Drawing. Filed Feb. 17, 1966, Ser. No. 528,073
Int. Cl. A61k 9/00, 25/02
U.S. Cl. 424—38       1 Claim

ABSTRACT OF THE DISCLOSURE

Biologically available iron is provided in the form of free-flowing, pleasant-tasting, powdery beadlets by coating the iron composition with at least one of a monoglyceride or a diglyceride of a saturated fatty acid of from about 16 to 18 carbon atoms. The beadlets are formed by spray chilling a molten suspension of the biologically available iron and the glycerides.

---

This invention relates to novel iron-containing compositions and, more particularly, is concerned with biologically available iron compositions in the form of free-flowing, pleasant-tasting stable beadlets.

The use of iron in a biologically available form, such as reduced iron, ferrous sulfate, ferrous fumarate, ferrous gluconate, ferric pyrrophosphate, and chelates such as iron choline citrate, as an iron supplement, is well known. Various formulations have been suggested for the oral administration of these iron supplements, but in general, they are quite unpalatable due to the unpleasant taste of the iron composition. Although it is possible to mask the taste of the iron in such formulations, as by the inclusion of flavoring agents, such techniques have not been entirely satisfactory due to the phenomenon of aftertaste.

More recently, it has been suggested that normally solid fatty acids be employed to coat the iron composition and to provide free-flowing iron-containing beadlets. However, the use of fatty acids for this purpose has not been particularly successful due to the undesirable processing characteristics of these fatty acids. That is, the coated iron composition must be stored for several weeks, often up to one to two months, before the taste of the iron is effectively masked. During this storage period, the fatty acid coated particles have a tendency to cake, thus necessitating further processing of the compositions to reduce the resulting agglomerates to a powder to permit formulation.

It has now been discovered by this invention that biologically available iron can be provided in the form of free-flowing, pleasant-tasting, powdery beadlets, which have no aftertaste and which are free from the undesirable characteristics of the fatty acid coated product. The product of this invention comprises beadlets of, as essential ingredients, a biologically available iron composition encased in coating of at least one of a monoglyceride or a diglyceride of a saturated fatty acid of from about 16 to 18 carbons. It is preferred that the coating be comprised essentially of a mixture of mono- and diglycerides such as the commercially available mixture of glyceryl mono- and distearates containing substantial amounts of glyceryl mono- and dipalmitates sold under the trademark of "Atmos 150" by Atlas Powder Company, Wilmington, Del. This product, which melts at 57–60° C., also contains small amounts (less than about 0.01 percent each) of butylated hydroxyanisole, butylated hydroxy-toluene, and citric acid as preservatives, Another commercial product which may be employed as the glyceride coating in accordance with this invention is a product sold under the trademark of "Hydrofol Glycerides T–57–L" by Archer-Daniels-Midland Company, Cleveland, Ohio.

The beadlets of this invention are prepared by first uniformly dispersing the particulate iron composition in a melt of the mono- and/or diglyceride. The particle size of the iron composition should be no more than about 75 microns, and preferably no more than about 50 microns. To ensure a reasonably stable suspension, it is also necessary to employ starch as a suspending agent for the iron. The suspending amount of starch can vary from about 5 to about 15 weight percent, based upon the combined weight of iron composition and glyceride. Amounts of less than about 5 percent are insufficient to provide the necessary stability and amounts of greater than about 15 percent unduly increase the viscosity of the molten glyceride composition. The amount of starch is preferably in the range of from about 10 to about 12 percent. The starch may be from any suitable source, with cornstarch being preferred.

The molten iron-glyceride suspension is atomized by conventional techniques, such as by the use of an atomizing nozzle or by causing the suspension to impinge upon the surface of a spinning disk. The resulting droplets are then chilled by contact with cool (about 20° C.) air. It is preferred to conduct such spray-chilling operations so that the size of the resulting substantially spherical beadlets is in the range of from about 70 microns to about 900 microns, and preferably from about 100 to about 600 microns. At less than about 70 microns, the surface area of the beadlets is so large that the glyceride is unable to efficiently mask the taste of the iron composition. On the other hand, if beadlets larger than about 900 microns are produced, the product, particularly when incorporated into a chewable composition, may be gritty to the taste and, in addition, may be crushed by the teeth and release the disagreeable tasting iron composition. Although it is not essential, it is desirable to screen the beadlets to insure proper size.

The weight ratio of iron composition to mono- and/or diglyceride is not narrowly critical but is preferably of from about 2:3 to about 3:2. At a ratio of about 2:3 and below, the beadlets have an undesirable waxy taste, and at ratios in excess of about 3:2, it is difficult to retain the iron composition in suspension in the molten glyceride without employing excess amounts of suspending agent. In addition to the iron composition, glyceride and starch, the beadlets may also contain other additives such as flavoring agents, dyes, and the like.

The beadlets of the present invention are readily employed for the preparation of various iron-containing formulations intended for use as iron supplements, including tablets, capsules, elixirs, and the like, for example, iron-fortified multivitamin tablets. They are of particular advantage for the preparation of chewable tablets.

The following examples are illustrative.

Example 1

A stirrer-equipped heated kettle was charged with 38.5 parts by weight of "Atoms 150." After heating to 90° C. to melt the glyceride composition, there was added 10 parts by weight of cornstarch and 0.5 part by weight of soluble saccharin, while stirring the molten mixture. To this mixture was then added 51.0 parts by weight of ferrous fumarate. The resulting suspension was held for 15 minutes and then pumped to a spinning disc atomizer and atomized into a chiling chamber containing circulating air at about 20° C. The beadlets which were formed were collected and sifted through a 30-mesh screen. These beadlets were free-flowing, stable on storage, and, when formulated into tablets, possessed no undesirable taste.

Example 2

To evaluate the effect of the "Atmos 150" coating, several 1000-tablet batches were prepared of chewable iron-fortified multivitamin tablets wherein the iron (ferrous fumarate) employed was either uncoated or in the form of "Atmos 150" beadlets prepared as described in Example 1 containing either 34 or 50 weight percent ferrous fumarate. The multivitamin granulation was a commercially employed granulation containing thiamine monostearate, pyridoxine, riboflavin, d-biotin, d-calcium pantothenate, vitamin E acetate, ascorbic acid, niacinamide, vitamin $B_{12}$, vitamin $D_2$, and vitamin A acetate.

The tablets were prepared by admixing the dyes with sugar. The multivitamin granulation was passed through a 12-mesh screen and admixed, together with the ferrous fumarate, with the dye-sugar mixture. The resulting mixture was passed through a 60-mesh screen and admixed with additional sugar. The entire formulation was mixed in a plastic bag and slugged. The slugs were ground through a 12-mesh screen, mixed and compressed. The final granulate was then compressed to form the tablets on a conventional tabletting machine.

The weights of the various components and the last evaluation of the remaining tablets are summarized as follows:

| Composition, parts by weight | Preparation | | |
|---|---|---|---|
| | A | B | C |
| Vitamin granulation | 450 | 450 | 450 |
| Ferrous fumarate: | | | |
| Uncoated | 31 | | |
| Coated | | | |
| 34 percent | | 93 | |
| 50 percent | | | 62 |
| Dyes | 3.875 | 3.875 | 3.875 |
| Sugar | 195.125 | 133.125 | 164.125 |
| Total | 680.000 | 680.000 | 680.000 |
| Taste | (1) | Waxy | Very good |

1 Good, but with bad aftertaste.

Example 3

The biological availability of the iron in glyceride-coated iron beadlets of this invention was determined by feeding each of four groups of ten rats a diet of cow's milk fortified with 1 gram/liter of sodium chloride, 0.6 gram/liter of manganese sulfate pentahydrate and 0.6 gram/liter of calcium sulfate pentahydrate for four weeks. Individual body weights and hemoglobin readings were taken at the beginning and weekly thereafter. When the average hemoglobin reading of a group of rats indicated anemia (6.0 gram percent Hb or less), each of three groups of rats was givn a daily oral dose of 0.1 milligram of iron per rat in the form of one of the vitamin preparations produced as described in Example 2 suspended in 10 milliliters of 5 percent gum acacia. The fourth, or control group, received only the milk diet throughout. The results of these tests are summarized as follows:

| Preparation | Average Body weight, gm. | Average Hb, gm. percent |
|---|---|---|
| Initial: | | |
| A | 33.7±0.8 | 7.3±0.5 |
| B | 32.8±1.1 | 7.5±0.4 |
| C | 33.7±1.0 | 8.2±0.5 |
| Control | 33.0±1.3 | 7.7±0.3 |
| After 1 week: | | |
| A | 45.8±0.9 | 6.0±0.3 |
| B | 42.3±1.3 | 6.0±0.4 |
| C | 44.7±1.1 | 5.9±0.4 |
| Control | 40.3±1.9 | 6.1±0.4 |
| After 2 weeks: | | |
| A | 65.0±1.5 | 7.6±0.4 |
| B | 62.0±2.0 | 7.8±0.4 |
| C | 62.0±1.9 | 8.3±0.5 |
| Control | 50.9±2.3 | 1 5.5±0.3 |
| After 3 weeks: | | |
| A | 78.0±1.7 | 8.9±0.5 |
| B | 78.1±2.8 | 8.8±0.4 |
| C | 77.9±2.7 | 9.3±0.5 |
| Control | 60.4±3.0 | 4.6±0.3 |

1 Only 9 samples—blood sample cloudy in one animal.

I claim:
1. In the art of administering an oral iron compound intended to be chewed prior to ingestion, the improvement which consists of the steps of chewing and ingesting a free-flowing, pleasant tasting, chewable substantially spherical powdery beadlet composition of matter having a final particle size in the range of about 70 microns to about 900 microns consisting essentially of a biologically available unpleasant tasting iron composition having an initial particle size of no more than about 75 microns, encased in a coating of at least one member of the group consisting of a monoglyceride and a diglyceride of a saturated fatty acid of from 16 to 18 carbons, prepared by the process which comprises
  (a) forming a substantially uniform dispersion of said iron composition in a melt of said glyceride with the aid of, as a suspending agent, starch in an amount of from about 5 to about 15 weight percent, based upon the combined weight of said iron composition and said glyceride and
  (b) spray-chilling said dispersion to form substantially spherical solid beadlets of said composition of matter.

References Cited

UNITED STATES PATENTS

| 2,805,977 | 9/1957 | Robinson et al. | 167—82 |
| 2,875,130 | 2/1959 | Grass et al. | 167—82 |
| 3,035,985 | 5/1962 | Stoyle et al. | 167—82 |
| 3,078,216 | 2/1963 | Greif | 167—82 |
| 3,108,046 | 10/1963 | Harbit | 167—82 |
| 3,146,167 | 8/1964 | Lantz et al. | 167—82 |

SHEP K. ROSE, Primary Examiner

U.S. Cl. X.R.
424—147, 295